May 13, 1958 S. ROBERTS 2,834,903
ELECTROLUMINESCENT LIGHTING DEVICE
Filed Oct. 30, 1952

Inventor:
Shepard Roberts,
by Paul A. Frank
His Attorney.

2,834,903
ELECTROLUMINESCENT LIGHTING DEVICE

Shepard Roberts, Scotia, N. Y., assignor to General Electric Company, a corporation of New York Application October 30, 1952, Serial No. 317,613

8 Claims. (Cl. 313—108)

The present invention comprises new and improved electroluminescent devices. It is the object of my invention to provide lighting means of improved reliability and increased length of life.

Heretofore, the operative elements of electroluminescent devices have consisted of oppositely disposed plate-shaped electrodes or armatures (one of which was light-transmitting) and an interleaved light-emitting means comprising an electroluminescent phosphor and a dielectric material which also functioned as a bonding agent for the phosphor.

I have discovered that superior operating characteristics, in particular less susceptibility to arcing and greater efficiency may be attained by providing between the conductive electrode elements, a dielectric material consisting of a plurality of zones or strata. Segregated in one of the strata of said dielectric material are the electroluminescent phosphor particles, another stratum is light-transmitting and devoid of phosphor particles. In most cases, only one zone devoid of phosphor is required in order to obtain improved characteristics, but a plurality of clear zones on opposite sides of the phosphor zone is a variant of my invention. Preferably, a dielectric material is employed and is applied by spray-deposition, whereby homogeneity and absence of voids and gas inclusions are insured. The novel features of my invention, however, are not restricted to the spray-deposition of dielectric material nor to any specific material.

Figure 1:
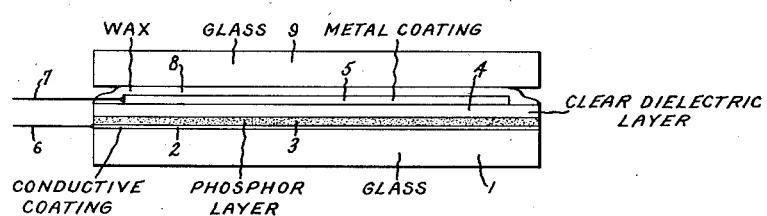
Figure 2:
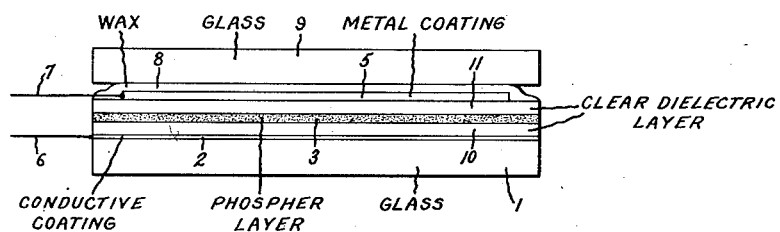

The accompanying drawing shows in cross section and on a greatly enlarged scale, electroluminescent devices embodying my invention. Fig. 1 shows in cross-section a device containing a single clear layer of dielectric material contiguous to a phosphor layer; and Fig. 2 is a cross-section of a device having multiple clear layers or strata respectively located on opposite sides of a phosphor layer. Fig. 1 shows a plate 1 of glass, or other suitable transparent material, on one surface of which is a transparent, conductive coating 2 of metal compound constituting one of the electrodes of the completed device.

Such coatings are well known and may consist of a transparent conductive compound of tin. Glasses coated with a conducting transparent material are commercially available. Over the conducting film 2 is deposited a layer 3 of electroluminescent phosphor.

Electroluminescent phosphors are described in my copending application, Serial No. 245,696, filed September 8, 1951, now Patent No. 2,731,423, and assigned to the same assignee as the present application. Such phosphors may be composed of fired mixtures of zinc sulfide and zinc selenide in a weight ratio of three to four and are activated with copper. Also, as disclosed in U. S. Patent 2,566,349—Mager, an electroluminescent phosphor may be prepared by firing zinc sulfide and zinc oxide and an activator of halogen, copper and lead.

One form of dielectric material adapted for the fabrication of devices embodying my invention comprises cellulose nitrate, preferably in combination with a suitable plasticizer. A suitable cellulose nitrate is one containing 11.8 to 12.2 percent nitrogen and being further identified by having a viscosity of 18 to 25 centipoises when dissolved to a concentration of 12.2% in a solvent consisting by weight of 25% ethanol, 20% ethyl acetate and 55% toluene. A solution containing by weight of 60 percent volatile solvent and 40% of cellulose nitrate solids may be compounded with a plasticizer. One form of plasticizer which is particularly suitable and is commercially available is Santicizer No. 8, sold by Monsanto Chemical Company, of St. Louis, Missouri, and consists of a mixture of N-ethyl ortho and para toluene sulfonamides, $CH_3C_6H_4SO_2NHC_2H_5$.

A suitable spray composition may be made by suspending five grams of phosphor powder in 50 ml. of clear nitrocellulose solution made up as follows:

100 grams of cellulose nitrate (40% solution)
20 grams of plasticizer and enough of a thinner to make up 600 ml. of spray solution.

A suitable thinner is the following composition by weight:

50 parts butyl acetate
        10 parts butyl alcohol
        40 parts toluene

Various other forms of resinous dielectric materials and other thinners may be used in place of nitrocellulose. Examples of commercially available materials suitable for this purpose in place of nitrocellulose are the following: polystyrene; methacrylate; polyvinyl chloride; alkyd resin (preferably a castor oil modified compound of glycerine and phthalic anhydride); 2,2-dinitropropane; nitrowax, polymerized ethylene, and a solid resinous form of methyl phenyl polysiloxane. One may use advantageously a copolymer of butadiene and acrylonitrile, known commercially as Chemigum N-3, and available as a product of Goodyear Tire & Rubber Company.

In general materials having a high dielectric constant and a low power factor are preferred. The phosphor layer 3 may be deposited on the conductively coated glass base 1 in any convenient way either by spraying a suspension of the phosphor in a dielectric solution or alternatively, phosphor particles may be suspended in water and caused to settle upon the surface of the conductively coated glass member, the glass member and the suspension being placed in a suitable container (not shown). When a desired film 3 of phosphor has settled out the supernatant liquid is removed and the deposited phosphor layer is allowed to dry. When dry, it is gently moistened as by carefully spraying with a bonding agent, such as one of those above-described.

When a sufficiently adherent phosphor layer 3 has been deposited, a layer 4 of dielectric material devoid of phosphor is superimposed on the phosphor layer. Additional coats of plastic material are applied as by spraying until the surface has a glossy appearance and a clear layer 4 of desired thickness has been applied. For example, the clear layer may be quite thin relative to layer 3 and may have a thickness of about one mil (0.001 inch) but for some purpose may be somewhat thicker.

An electrode 5 then is superimposed on the clear layer. The electrode 5 may consist of a paste of finely divided metal, for example, silver, brushed or sprayed over the clear layer 4. Suitable terminal conductors 6 and 7 finally are supplied for the electrodes 2 and 5.

In order to exclude atmospheric moisture as completely as possible, the described combination is given coat 8 of a suitable moisture-excluding agent, as, for example, a suitable wax, to which a glass plate 9 subsequently is sealed. The glass plate 1 and deposited layers may be heated to about 70 to 80° C. and melted wax, for example, ceresin, is painted over the described combination. After the wax has been applied and while the wax still is molten, the glass plate 9 is applied over the wax.

When it is desired to provide multiple clear, light-stratum 10 of clear dielectric material is deposited under the phosphor-layer 3. Care must be exercised to avoid having the deposited layers absorb so much spray solvent as to be softened to such a degree that the phosphor will sink by gravity into the stratum 10 thus defeating the original intent. One way of avoiding such undesired absorption of solvent is to heat the glass plate 1 and the deposited layers 3 and 10 to a temperature sufficiently high to cause rapid evaporation of the solvent employed in spraying a clear layer or stratum 11 superimposed on the phosphor layer 3; otherwise the phosphor particles tend to sink into the stratum 10 under the phosphor layer.

Alternatively, an unlike dielectric material may be employed for the layers 10 and 11, and unlike solvents. The solvent for the clear stratum 11 which is applied over the phosphor stratum being chosen to be inert with respect to the layer 10 and the medium which bonds the phosphor particles.

The unforeseen behavior of the clear stratum, or strata, in reducing arcing and in general increasing the length of useful life of the electroluminescent device may be explained by the assumption that at least some of the phosphor particles are electrically conductive to some degree. Should one or more conductive phosphor particles contact with one of the electrodes (as in a structure in which no stratum devoid of phosphor is present) then a condition favorable to arcing between the electrodes would be set up. As the phosphor particles normally are non-conducting, the explanation that arcing is due to conductive phosphor is theoretical to explain the fact that arcing is substantially reduced or suppressed by the present construction.

What I claim is new and desire to secure by Letters Patent of the United States is:

1. An electroluminescent device comprising a pair of superposed electrically conductive layers, one of said layers being light-transmitting, an electroluminescent phosphor of a low resistance type dispersed in a solid light transmitting dielectric material sandwiched between said conductive layers, and a light transmitting insulating layer interposed between said phosphor dielectric layer and said light transmitting conductive layer, said dielectric material and the material composing said insulating layer each being soluble in a solvent in which the other is not.

2. An electroluminescent device comprising a transparent glass plate having an electrically conductive light-transmitting coating formed thereon, an insulating layer superposed thereover consisting essentially of a first light transmitting solid dielectric material adherent to said conductive coating, a layer thereover of an electroluminescent phosphor of a low resistance type dispersed in a second solid dielectric material adherent to said insulating layer, said second material being soluble in a solvent by which said first material is substantially unaffected, and a layer of conducting material formed over said phosphor dielectric layer and adherent thereto.

3. An electroluminescent device comprising a glass plate having an electrically conductive light-transmitting coating formed thereon, an insulating layer of nitrocellulose formed over said conductive coating and adherent thereto, a layer of an electroluminescent phosphor dispersed in polystyrene superposed thereover, and a layer thereover of a conductive material.

4. A luminous device comprising substantially parallel superposed electrodes at least one of which forms a substantially continuous surface and is light transmitting, a solid laminated light transmitting resinous dielectric material filling the space therebetween and being characterized by having a first layer thereof containing inclusions of electroluminescent phosphor and having a second layer thereof consisting essentially of light transmitting dielectric material which is substantially devoid of inclusions, the second layer being interposed between said light transmitting electrode and said first-mentioned layer and substantially parallel with the surface of said light transmitting electrode and with the first mentioned layer, a plasticizer dispersed in said resinous material, and a moisture excluding material encasing at least a portion of said device.

5. An electroluminescent cell comprising a glass base plate, a light transmitting electrically conductive coating formed upon said base plate, a solid body of laminated light transparent dielectric material overlying said conductive coating and comprising a first layer containing inclusions of an electroluminescent phosphor, and a second layer interposed between said first layer and said light transmitting conductive coating and consisting essentially of light transmitting dielectric material which is substantially devoid of inclusions, an electrically conductive layer overlying said body of dielectric material, a layer of sealing material covering at least the edges of said conducting layer, and a layer of truly moisture impervious material overlying said sealing layer and adhering thereto so as to effectively seal said dielectric material from atmospheric moisture.

6. The electroluminescent cell of claim 5 in which the truly moisture impervious material comprises a glass plate.

7. An electroluminescent device comprising a first electrically conductive layer, a second superposed electrically conductive layer, said second conductive layer being light transmitting, an electroluminescent phosphor dispersed in solid dielectric material sandwiched between said conductive layers, and an insulating layer interposed between said phosphor dielectric layer and said first conductive layer, said dielectric material and the material composing said insulating layer each being soluble in a solvent in which the other is not.

8. A luminous device comprising substantially parallel superposed electrodes at least one of which forms a substantially continuous surface and is transparent, a solid laminated resinous dielectric material filling the space therebetween and being characterized by having a first light transmitting layer formed over the transparent electrode and containing inclusions of electroluminescent phosphor and having a second layer overlying said first layer and consisting essentially of dielectric material which is substantially devoid of inclusions, the second layer being substantially parallel with the surface of said transparent electrode and with the first-mentioned layer, a plasticizer dispersed in said resinous material, and a moisture excluding material encasing at least a portion of said device.

References Cited in the file of this patent

UNITED STATES PATENTS

| | | |
|---|---|---|
| 2,566,349 | Mager | Sept. 4, 1951 |
| 2,624,857 | Mager | Jan. 6, 1953 |
| 2,684,450 | Mager | July 20, 1954 |

OTHER REFERENCES

G. Destriau, The New Phenomenon of Electrophotoluminescence Philosophical Mag., vol. 38, October 1947, pp. 700, 701, 702, 711–713 and 723.